(12) United States Patent
Holmberg et al.

(10) Patent No.: US 6,714,961 B1
(45) Date of Patent: Mar. 30, 2004

(54) MULTIPLE JOB SIGNALS PER PROCESSING UNIT IN A MULTIPROCESSING SYSTEM

(75) Inventors: Per Anders Holmberg, Stockholm (SE); Terje Egeland, Värmdö (SE); Nils Ola Linnermark, Haninge (SE); Karl Oscar Joachim Strömbergson, Mölndal (SE); Magnus Carlsson, Kållered (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/438,923

(22) Filed: Nov. 12, 1999

(30) Foreign Application Priority Data

Nov. 16, 1998 (SE) ................................. 9803901
Mar. 29, 1999 (SE) ................................. 9901145

(51) Int. Cl.⁷ ................................. G06F 9/00
(52) U.S. Cl. ............... 709/106; 709/101; 709/103; 712/23; 712/234; 712/235
(58) Field of Search ............... 709/106, 103, 709/101; 712/224, 235, 23

(56) References Cited

U.S. PATENT DOCUMENTS

| | | | |
|---|---|---|---|
| 4,466,061 A | 8/1984 | DeSantis et al. | 709/106 |
| 5,072,364 A | 12/1991 | Jardine et al. | 712/215 |
| 5,195,181 A | 3/1993 | Bryant et al. | 709/215 |

(List continued on next page.)

FOREIGN PATENT DOCUMENTS

| | | |
|---|---|---|
| EP | 230721 | 8/1987 |
| JP | 3263164 | 11/1991 |
| JP | 4100449 | 4/1992 |
| JP | 5274279 | 10/1993 |
| JP | 6276198 | 9/1994 |
| JP | 10143382 | 5/1998 |
| WO | 88/02513 | 4/1988 |
| WO | 99/31589 | 6/1999 |

OTHER PUBLICATIONS

Multiscalar Processors, Computer Sciences Department, University of Wisconsin–Madison, Madison, WI 53706, Gurindar S. Sohi, et al.

The Effect of Speculative Execution on Cache Performance, University of Michigan, Jim Pierce, et al, 0–8186–5602–6/941994 IEEE.

Hardware for speculative Run–Time Parallelization in distributed Shared–Memory Multiprocessors, University of Illinois at Urbana–Champaign, IL 61801, Ye Zhang, et al, 0–8186–8323–6/98 1998 IEEE.

(List continued on next page.)

*Primary Examiner*—Anil Khatri
*Assistant Examiner*—Thomas Pham

(57) ABSTRACT

The invention is directed toward a multiprocessing system having multiple processing units. For at least one of the processing units in the multiprocessing system, a first job signal is assigned to the processing unit for speculative execution of a corresponding first job, and a further job signal is assigned to the processing unit for speculative execution of a corresponding further job. The speculative execution of said further job is initiated when the processing unit has completed execution of the first job. If desirable, even more job signals may be assigned to the processing unit for speculative execution. In this way, multiple job signals are assigned to the processing units of the processing system, and the processing units are allowed to execute a plurality of jobs speculatively while waiting for commit priority. By assigning multiple job signals for speculative execution by one or more processing units, the effects of variations in execution time between jobs are neutralized, and the overall performance of the processing system is substantially improved.

23 Claims, 5 Drawing Sheets

U.S. PATENT DOCUMENTS

| | | | |
|---|---|---|---|
| 5,239,539 A | 8/1993 | Uchida et al. | 370/398 |
| 5,287,467 A | 2/1994 | Blaner et al. | 712/235 |
| 5,379,428 A | 1/1995 | Belo | 709/103 |
| 5,511,172 A | 4/1996 | Kimura et al. | 712/235 |
| 5,560,029 A | 9/1996 | Papadopoulos et al. | 712/25 |
| 5,740,393 A | 4/1998 | Vidwans et al. | 712/215 |
| 5,781,753 A | 7/1998 | McFarland et al. | 712/218 |
| 5,787,300 A | 7/1998 | Wijaya | 712/1 |
| 5,797,025 A * | 8/1998 | Popescu et al. | 712/23 |
| 5,812,839 A | 9/1998 | Hoyt et al. | 712/239 |
| 5,832,262 A | 11/1998 | Johnson et al. | 709/102 |
| 5,848,257 A | 12/1998 | Angle et al. | 712/219 |
| 5,870,597 A | 2/1999 | Panwar et al. | 712/230 |
| 5,875,326 A | 2/1999 | Cheong et al. | 712/244 |

OTHER PUBLICATIONS

*Operating System Concepts,* Abraham Silberschatz, et al. Addison–Wesley Series in Computer Science, Jun., 1988, Chapter 4, pp. 149–185.

MAJC™Documentation, First MAJC™Implementation Presentation, MAJC–5200: A VLIW Convergent MPSOC by Marc Tremblay, Chief Architect, Microprocessor Forum, Oct. 1999; Introduction to the MAJC™ Architecture; MAJC Architecture Presentation; and MACK Architecture Tutorial, at http://wwwwseast.usec.sun.com/ microelectronics/MAJC/documentation, Nov. 10, 1999.

\* cited by examiner

MULTIPLE JOB SIGNALS PER PROCESSING UNIT IN A MULTIPROCESSING SYSTEM

BACKGROUND

The present invention generally relates to processing systems, and more particularly to a processing system having multiple processing units, and a method for handling job signals in such a processing system.

Many conventional central processing systems, such as the APZ processing system in the known AXE Digital Switching System from Telefonaktiebolaget LM Ericsson, are built around a single processing unit, referred to as an execution pipeline in the AXE system. However, central processing systems based on a single processing unit have limitations with regard to capacity.

One way of increasing the processing capacity is to build the processing system as a multiprocessor system, i.e. a processing system with multiple processors or processing units operating in parallel. In conventional multiprocessing systems, each processing unit processes an input signal to execute a corresponding sequence of instructions, one input signal being assigned to each processing unit at a time.

In a so-called superscalar processor, which explores fine grained parallelism found between neighboring instructions, the functional units within the processor are arranged to simultaneously execute several instructions in parallel.

However, there is still a general demand for even more efficient processing systems.

SUMMARY

The present invention constitutes a further development of the prior art multiprocessing system.

The invention is directed towards a multiprocessing system adapted for speculative execution of jobs. In a multiprocessing system, the processing units independently execute different jobs in parallel. However, at all times during parallel execution of jobs in a processing system adapted for speculative execution, only one processing unit has commit priority and is allowed to execute its current job non-speculatively, performing write back to the memory system and committing signal sendings. Jobs in the other processing units are executed speculatively and may be flushed if dependencies are detected.

During development of such a processing system, a particular problem was encountered: If the job with commit priority has a longer execution time than the other speculative jobs, the speculatively executing processing units have completed execution of their assigned jobs long before completion of the commit job. The speculatively executed jobs then have to wait until the commit job has been executed to completion so that one of the speculatively executed jobs can get commit priority. This generally means that the speculatively executing processing units simply wait for commit priority and valuable execution time is wasted, severely degrading the performance of the processing system.

Therefore, it is a general object of the present invention to provide a more flexible and efficient speculative multiprocessing system as well as a more efficient method for handling job signals in such a multiprocessing system.

It is another object of the invention to provide a job queue for use in a multiprocessing system.

These and other objects are met by the invention as defined by the accompanying patent claims.

The general idea according to the invention is based on assigning, for at least one processing unit in the multiprocessing system, a first job signal to the processing unit for speculative execution of a corresponding first job, assigning a further job signal to the processing unit for speculative execution of a corresponding further job, and initiating speculative execution of said further job when the processing unit has completed speculative execution of the first job. If desirable, even more job signals may be assigned to the processing unit for speculative execution, execution of the corresponding jobs being initiated as soon as the processing unit has completed speculative execution of the previously assigned job. The processing unit with commit priority may also be assigned a further job signal, the execution of which is initiated as soon as the commit job has been completed.

By assigning multiple job signals for speculative execution by the processing units, the effects of variations in execution time between jobs are neutralized or at least greatly reduced, and the overall performance of the processing system is substantially improved since the processing units are allowed to execute a plurality of jobs speculatively while waiting for commit priority.

In general, the protocol needed for assigning job signals to the processing units, keeping track of the job signals and handling the commit priority is managed by a job signal queue in combination with appropriate control software or hardware.

In order to identify a job signal, its corresponding job or the results thereof in the operation of the processing system, each job signal is associated with an identifier. The identifier may be in the form of a pointer to the storage position of the corresponding job signal in the job signal queue. Alternatively, the identifier comprises a unit label representing the identity of the processing unit to which the job signal is assigned, and a job-signal distinguishing label representing the identity the job signal is given in the processing unit. In a processing system adapted for speculative execution, the results of speculatively executed jobs are temporarily stored in a write queue arrangement, waiting to be committed. According to the invention, when a speculatively executed job gets commit priority the results of that job are retrieved by means of the identifier.

The invention offers the following advantages:

The overall performance of the processing system is substantially improved;

Flexible and efficient speculative execution is provided; and

The effects of variations in execution time between jobs are neutralized.

Other advantages offered by the present invention will be appreciated upon reading of the below description of the embodiments of the invention.

BRIEF DESCRIPTION OF THE DRAWINGS

The invention, together with further objects and advantages thereof, will be best understood by reference to the following description taken together with the accompanying drawings, in which.

DETAILED DESCRIPTION

Figure 1:
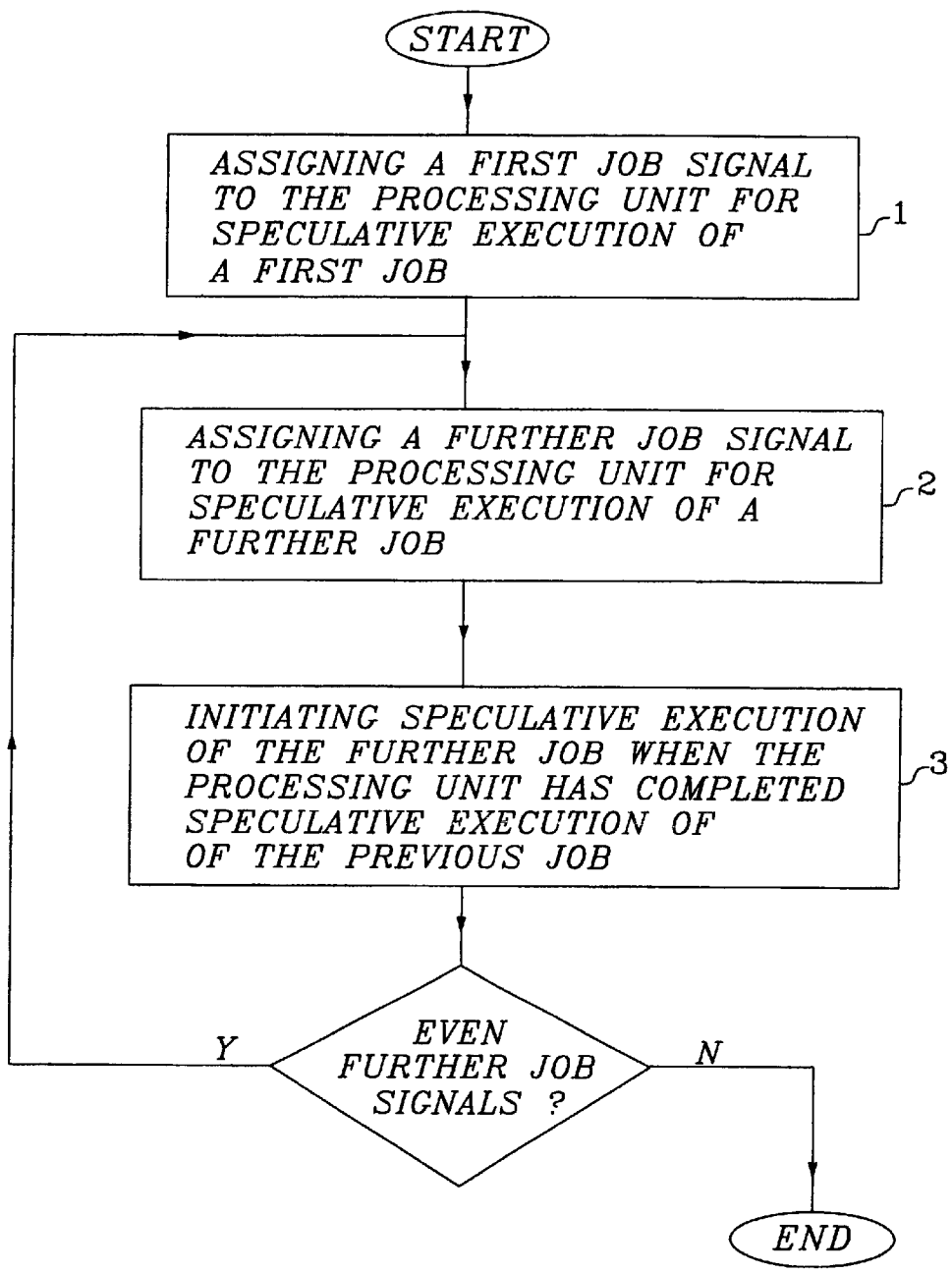
FIG. 1 is a schematic flow diagram of a method for handling job signals according to the invention.

Throughout the drawings, the same reference characters will be used for corresponding or similar elements.

FIG. 1 is a schematic flow diagram of a method for handling job signals according to the invention. In a processing system having multiple processing units for job signal processing, job signals are assigned to processing units for execution of corresponding jobs. In general, the following steps are performed for at least one of the processing units: In step 1, a first job signal is assigned to the processing unit for speculative execution of a corresponding first job. In the case of the processing unit with commit priority, the job is executed non-speculatively. In step 2, a further job signal is assigned to the processing unit for speculative execution of a corresponding further job. In step 3, when the processing unit has completed execution of the first job, speculative execution of the further job is initiated. It is of course possible to repeat steps 2 and 3 for even further job signals.

In this way, the processing units are allowed to execute a plurality of jobs speculatively while waiting for commit priority. In theory, the number of jobs assigned to the same processing unit at the same time is not limited.

It should be understood that each job signal is intimately interrelated to its corresponding job and the results of said job.

In the following, the invention will be described with reference to an example of a realization of a multiprocessing system adapted for speculative execution. It should however be understood that the invention is not limited thereto.

Figure 2:
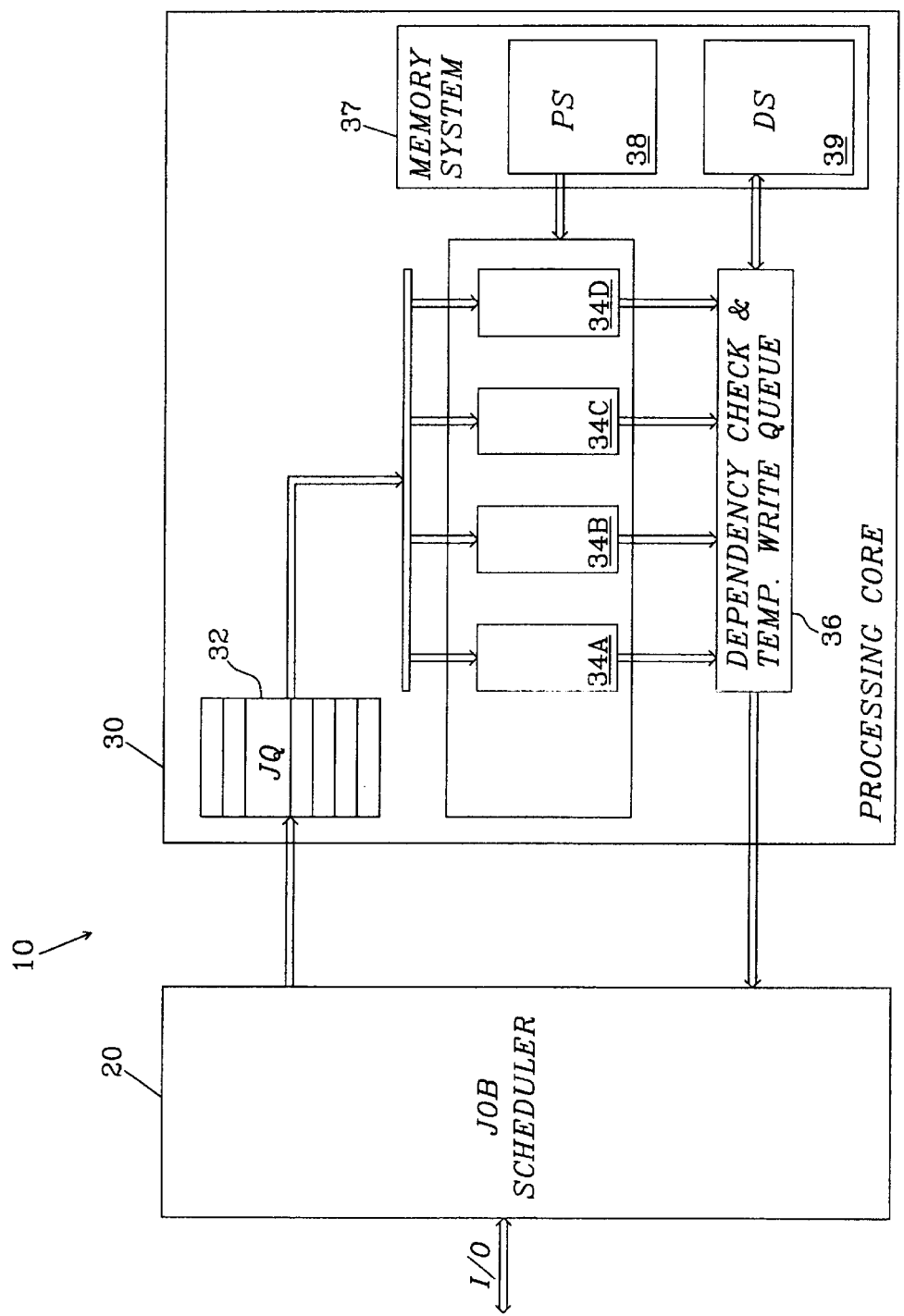
FIG. 2 is a schematic diagram of a processing system according to the invention.

FIG. 2 is a schematic diagram of a processing system according to the invention. The processing system 10 basically comprises a job scheduler 20 and a processing core 30. The processing core 30 is adapted for speculative execution of jobs, and the processing units 34A–D of the processing core 30 are preferably in the form of specialized hardware such as execution pipelines, although standard off-the-shelf microprocessors also are feasible.

The job scheduler 20 receives job signals, which represents events, from external units as well as from the processing core 30, and schedules the job signals for processing by the processing core 30. An example of a specific type of job scheduler is the signal-processing unit (SPU) in the known AXE Digital Switching Systems from Telefonaktiebolaget LM Ericsson.

The processing core 30 basically comprises a job signal queue 32, simply referred to as a job queue, a plurality of execution pipelines 34A–D, a combined dependency checking unit and temporary write queue 36 for handling data dependencies, and a memory system 37 divided into a program store 38 and a data store 39.

The job signals from the job scheduler 20 are buffered in the job queue 32, which has a number of storage positions for storing the job signals. Each job signal is stored together with additional information in a respective storage position of the job queue 32. In general, each job signal comprises a header and data. In addition to administrative information, the header normally includes a pointer to software code in the program store 38, and the data of the job signal includes input operands necessary for execution of the corresponding job. The data could be a signal message from an external unit such as a regional processor or another processor. A job may be defined as the instruction stream specified by the signal header, and the job starts with the reception of the job signal and ends by the calling of an end-job routine. It should however be noted that the job signal itself normally does not include any instructions. The job signal normally includes a pointer to instructions in the software code stored in the program store 38, and operands required in the execution of the instructions, generally making the job signal self-contained.

Preferably, the execution pipelines 34A–D independently "fetch" job signals from different storage positions in the job queue 32 to independently execute different jobs in parallel. Whenever an execution pipeline is free to start executing a new job, the job queue 32 is examined to find an unallocated job signal, and the unallocated job signal is assigned to the pipeline. The job signal is then processed in the execution pipeline and the corresponding job is executed. In this particular example, four pipelines are operable for executing four different jobs in parallel, independently of each other. At all times during parallel job execution, only one job signal in the job queue 32 is in commit position, allowing the execution pipeline to which the job signal is assigned to commit the corresponding job, i.e. performing write-back to the memory system 37 and committing signal sendings. The jobs in the other execution pipelines are executed speculatively and may be flushed if a data dependency is detected by the dependency-checking unit 36.

A general requirement for systems where the information flow is governed by protocols is that certain related events must be processed in the received order. This is the invariant of the system, no matter how the system is implemented. The commit order between jobs is defined by the arrival to the processing core and will generally not be changed. However, in a processing system handling job signals of different priority levels, it may be useful to put a job signal of higher priority level before job signals of lower priority.

In general, each execution pipeline comprises circuitry for fetching instructions from the program store, decoding the instructions, executing the instructions and performing memory write back. An example of a specific execution pipeline that can be used by the invention is the pipeline in the Ericsson AXE Digital Switching Systems.

The dependency-checking unit 36 is generally implemented by using one or more read buffers associated with the execution pipelines 34A–D. When a pipeline fetches data from the data store 39, the read address or addresses are buffered in the read buffer(s). When the execution pipeline with commit priority performs write-back to the data store 39, the write address to the data store is compared to the read addresses in the read buffer(s) to see if there are data dependencies between the jobs. If data read by a speculatively executing job is subsequently modified by the committed job, a data dependency exists and the speculatively executed job has to be flushed and restarted. The flushed job can be restarted from the job queue 32. Job signals corresponding to jobs that have been committed are removed from the job queue 32, thereby allowing new job signals from the job scheduler 20 to be buffered in the job queue 32.

Data store modifications proposed by a speculatively executed job are logged in the temporary write queue 36, but not written into the data store 39 until the job gets commit priority. When a speculative job gets commit priority, the entries in the temporary write queue 36 that belong to the job in question are immediately written into the data store 39. However, it should be understood that a commit job in execution generally does not store its data in the write queue, but simply forwards the corresponding memory address to the dependency-checking unit to enable dependency checking. Job signals generated by a job with commit priority are forwarded to the job scheduler 20, where they are scheduled for later processing or sent to an input/output device (not shown) to be distributed to an external unit.

An example of a specific type of dependency checking unit and temporary write queue is disclosed in the international patent application WO 88/02513.

During development and testing of the processing system of FIG. 2, a particular problem was encountered. When the job with commit priority has a longer execution time than the speculative jobs, the speculatively executing processing units have completed execution of their assigned jobs long before completion of the commit job. The speculatively executed jobs then have to wait until the commit job has been executed to completion and finally committed so that one of the speculatively executed jobs can get commit priority. This generally means that the speculatively executing processing units simply wait for commit priority and valuable execution time is wasted, severely degrading the performance of the processing system. Simulations for telecommunication applications have shown that the capacity of only two equivalent single-pipe processing systems was obtained by a processing system having a multi-pipe of four equivalent pipelines; a ratio of 2:4 which is far from optimal.

Of course, the above reasoning also holds true for a speculative job that has a longer execution time than other speculative jobs. When a speculative job with a long execution time gets commit priority, the other speculative jobs have already been executed to completion, and are simply waiting for commit priority.

According to the invention, multiple job signals are assigned to at least one of the execution pipelines, and speculative execution of a next job is initiated as soon as the previous job has been executed to completion. In this way, the execution pipelines are allowed to execute a plurality of jobs speculatively while waiting for commit priority. By executing several jobs per pipeline, the effects of variations in execution time between jobs are neutralized or at least reduced, and the above single-pipe-to-multi-pipe ratio is substantially improved.

In general, the protocol needed for assigning job signals to the execution pipelines 34A–D, keeping track of jobs that have been speculatively executed to completion, successively assigning commit priority to the job signals, and removing job signals that have been committed is managed by the job signal queue 32 in combination with appropriate control software or hardware.

The job queue 32 is normally an ordinary queue with a number of storage positions. As an example, the job queue 32 may be implemented in a common memory by logically dividing a predetermined part of the memory into a number of storage positions, each of which having its own individual memory address. In general, each storage position in the job queue 32 is divided into a number of fields, for example as described in Table I below.

TABLE I

| Field name | Description |
| --- | --- |
| Valid | If set, the storage position contains a valid job signal |
| Taken | If set, the job signal has been assigned to an execution pipeline |
| Finished | If set, the corresponding job has been executed to completion, but not committed |
| $U_L$ & $D_L$ | $U_L$ represents the identity of the pipe handling the job signal, and $D_L$ represents the identity the job signal is given in the pipe. The field is normally a concatenation of UL and DL |
| Signal | The signal header and data |

The field 'Valid' is used for indicating whether a storage position contains a valid job signal or not. When a job signal is received from the scheduling unit 20, it is placed in the first free position of the job queue 32, i.e. a position in which the Valid flag is not set. The Valid flag is then set to indicate that the 'Signal' field now contains a valid job signal, and the position is occupied. The field 'Taken' is used for indicating whether the job signal has been assigned to a pipeline or not. When a job signal in a storage position of the job queue 32 is assigned to an execution pipeline, the Taken flag for that position is set to indicate that the job signal has been assigned.

The field 'Finished' is used for indicating that a job has been speculatively executed to completion, and the field '$U_L$ & $D_L$' is used for indicating the identity of the pipe and the identity the job signal and/or the corresponding job is given in that pipe. When a pipeline has executed the end-job routine for a first job, the Finished flag is set to signal that the job has been executed to completion and is ready to be committed. The pipeline is now ready to fetch a second speculative job signal. The first job is assigned the job id "1" of the pipe in question and the second job to be executed in the pipe is assigned the job id "2". If the pipe finishes the second job before it receives commit priority, a third speculative job may be executed, and so on. In general, a trade-off between the number of jobs per pipe and complexity is made, so in practice the number of jobs per pipe is limited.

In a processing system adapted for speculative execution, jobs may generally be in the following states: Not_Started, Started and Finished. These states may be encoded in the job queue 32 in different ways, and it should be understood that the fields Valid, Taken and Finished of Table I is merely an example of one way of encoding these job states.

Preferably, the job queue 32 is associated with a pointer that points out which storage position in the job queue 32 that is in commit position. The job signal in commit position has commit priority, and the execution pipeline handling this job signal is enabled to perform write-back to the memory system 37 and send job signals to the job scheduler 20.

Figure 3:
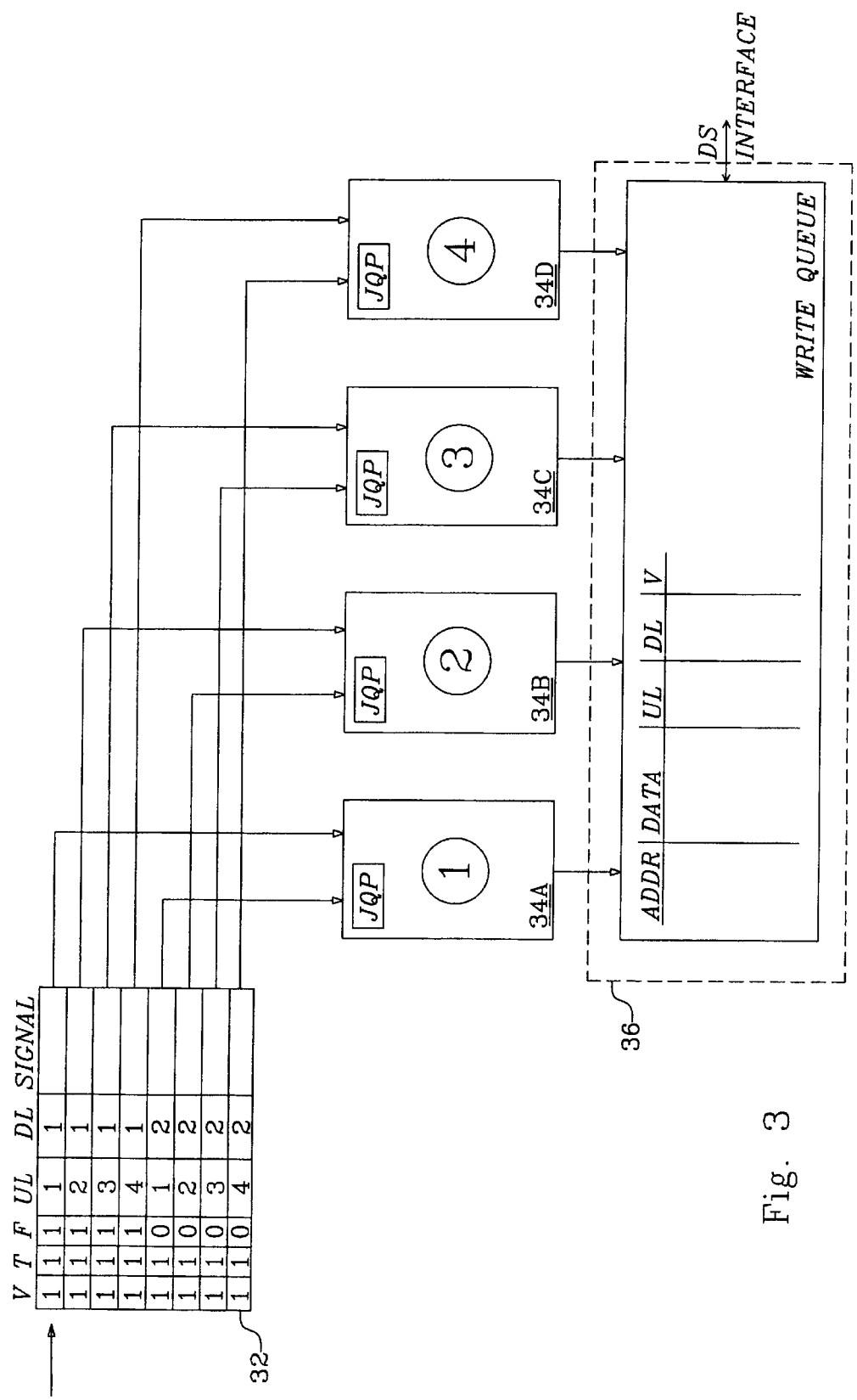
FIG. 3 is a schematic diagram illustrating the interrelationship between the job signal queue, the processing units and a write queue arrangement according to a first preferred embodiment.

FIG. 3 is a schematic diagram illustrating the interrelationship between the job signal queue, the processing units and a write queue arrangement according to a first preferred embodiment. In this particular example, it is assumed that there are four different pipelines 34A–D operating in parallel. Each pipeline is assigned a unique unit label (1–4). It is also assumed that each pipeline is capable of handling two jobs. Therefore, for reasons of clarity and simplicity, the job queue 32 is illustrated as has having eight storage positions. Each storage position includes the fields V (Valid), T (Taken), F (Finished), $U_L$ (Pipe id), $D_L$ (Job id) and SIGNAL. In FIG. 3, the field '$U_L$ & $D_L$' is illustrated as two separate fields $U_L$ and $D_L$ rather than as a single concatenation field. Both realizations are possible.

Job Start

An example of how to start a new job will now be described. First, an execution pipeline that is ready for execution requests a new job signal from the job queue 32. Preferably, the pipeline also indicates which identity the new job signal should be given in the pipe. Next, the job queue 32 is traversed by conventional means, and the Valid flags and the Taken flags of the storage positions in the job queue 32 are examined to find the next position which contains a valid unallocated job signal. A pointer to the storage position of the unallocated job signal is transferred to job queue pointer register (JQP) of the requesting execution pipeline. The pointer may be in the form of a memory address to the storage position. The pipeline in question automatically reads its JQP register for the pointer to the next job signal, and subsequently copies the job signal given by the pointer into the pipeline to start executing the corresponding job. The Taken flag for that position of the job queue 32 is set, and the identity of the pipeline and the identity the job is given in the pipe are written into $U_L$ and $D_L$, respectively. In this way, the job signals stored in the job queue 32 are assigned to the execution pipelines 34A–D, and the signal fields of the storage positions are set accordingly.

In the example of FIG. 3, each one of the storage positions of the job queue 32 contains a valid (V=1) job signal that has been assigned (T=1) to one of the execution pipelines 34A–D. The jobs corresponding to the job signals of the first four positions have been executed to completion (F=1), awaiting commit priority. The jobs corresponding to the job signals of the last four positions are in the process of being speculatively executed, but none of the jobs have been finished (F=0). As soon as a job has been speculatively executed to completion, the corresponding Finished field is set.

The results of the speculatively executed jobs are logged in a write queue arrangement 36, but not written into the data store 39 until the job is committed. According to the first preferred embodiment of the invention, as illustrated in FIG. 3, the write queue arrangement 36 includes a write queue that is common to all execution pipelines. Each entry in the write queue is then provided with a pipe-id tag and a job-id tag indicating which pipeline and which one of the speculative jobs of the indicated pipeline that the entry belongs to. The pipe-id tag and the job-id tag correspond to $U_L$ and $D_L$, respectively. Accordingly, each entry in the write queue includes an address (ADDR) to the data store 39, associated data (DATA), a pipe-id tag ($U_L$), a job-id tag ($D_L$) and a valid flag (V).

The job signal in the commit position, indicated by the arrow pointing to the job queue 32 in FIG. 3, has commit priority, and the execution pipeline handling this job signal is enabled to write to the data store 39. When a job signal is moved into commit position, the unit label of that storage position is examined to determine which pipe is responsible for the job signal and that pipe starts to commit all write operations and signal sendings for the job. By using the unit label $U_L$ and the job-signal distinguishing label $D_L$ stored in the commit position of the job queue 32, the relevant results can be retrieved from the write queue and written into the data store 39. When this has been done, the position is released by clearing the Valid flag and the job queue 32 is stepped by conventional means to move a new storage position into commit position, thus successively assigning commit priority to the job signals of the job queue 32. The scheduling unit 20 is informed that the job has been executed to completion and the job queue 32 is now ready to receive a new job signal from the scheduling unit.

Job Restart at Flush

Now, an example of how to handle a flush will be described briefly. At flush, when a data dependency is detected, execution of the job to be flushed is normally interrupted in the pipeline, the job is put into a Not-Started state again, and those entries in the write queue that belong to the flushed job are invalidated.

In more detail, the pipe-id tag ($U_L$) of the entry in the write queue 36 for which a dependency has been detected identifies the pipeline that handles the job to be flushed. If the job is executing, the pipeline normally gets an interrupt. The JQP register of the identified execution pipeline holds a pointer to the storage position of the job signal in the job queue 32. By using the unit label $U_L$ and the distinguishing label $D_L$ of the storage position identified by the job queue pointer, the corresponding entries in the write queue can be invalidated. The Finished flag and the Taken flag of the corresponding storage position in the job queue 32 are removed, and the job can then be restarted. If the fields $U_L$ and $D_L$ of the relevant storage position in the job queue 32 are cleared, the job signal may be assigned to any execution pipeline that is free to start execution, and associated with a new unit label and a new job-signal distinguishing label. Alternatively, the job signal corresponding to the flushed job is reassigned to the pipeline identified by the unit label associated with the job signal, and the job signal is associated with a new job-signal distinguishing label $D_L$.

A job to be flushed does not necessarily have to be interrupted if it is executing. However, in terms of performance, it is more advantageous to interrupt the job.

Figure 4:
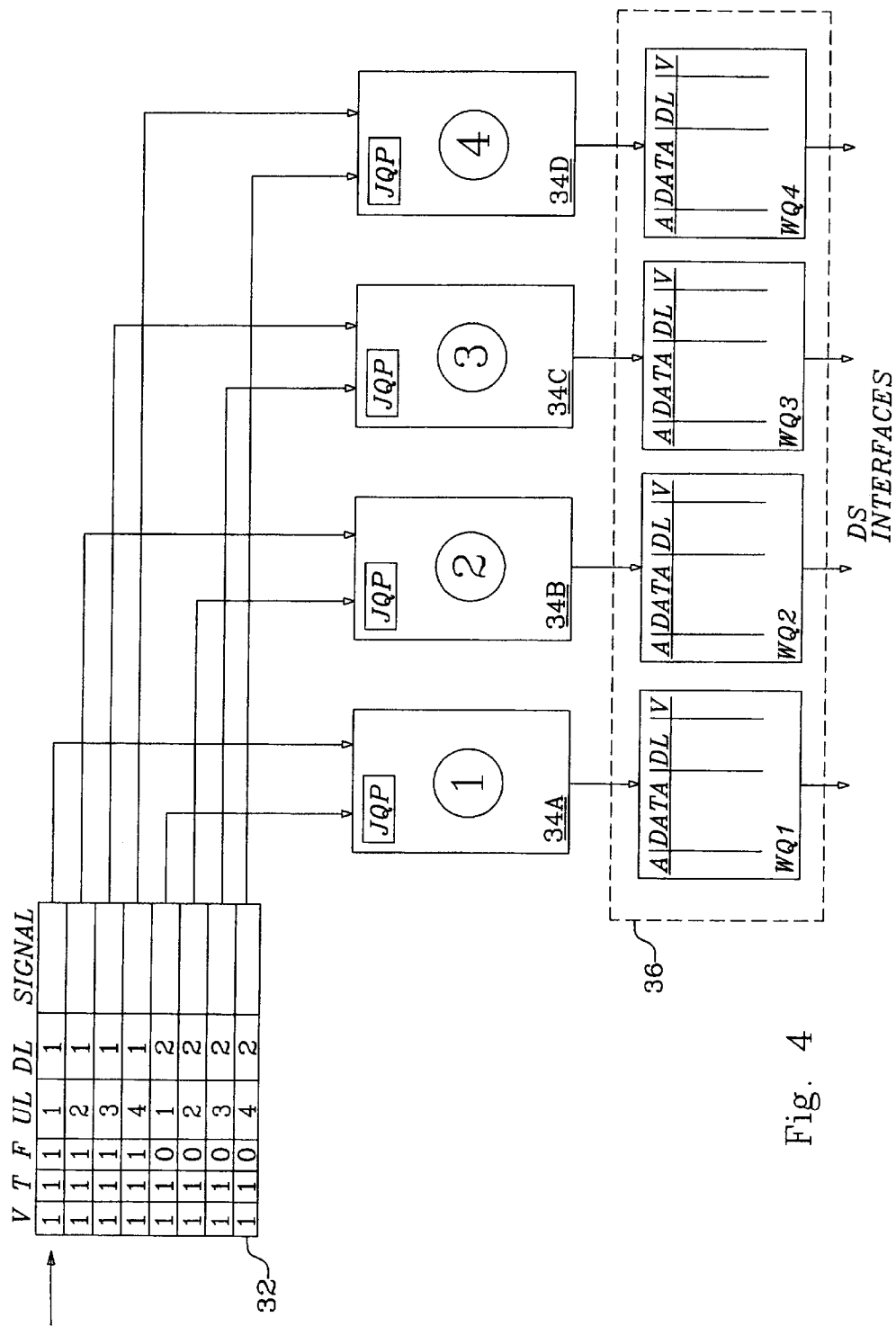
FIG. 4 is a schematic diagram illustrating the interrelationship between the job signal queue, the processing units and a write queue arrangement according to a second preferred embodiment.

FIG. 4 is a schematic diagram illustrating the interrelationship between the job signal queue, the processing units and a write queue arrangement according to a second preferred embodiment. FIG. 4 is identical to FIG. 3 except for the write queue arrangement 36. In FIG. 4, the write queue arrangement 36 comprises a number of separate write queues WQ1–WQ4, one write queue for each one of the execution pipelines 34A–D. By having a dedicated write queue for each pipeline, it is sufficient to provide each entry in each write queue with a job-id tag instead of a job-id tag as well as a pipe-id tag. Consequently, each entry in the write queues WQ1–WQ4 includes an address (A) to the data store 39, associated data (DATA), a job-id tag ($D_L$) and a valid flag (V). When a job signal in the job queue 32 is moved into commit position, the unit label $U_L$ of that storage position is examined to determine which pipeline that is responsible for the job signal. At the same time, the corresponding write queue is also identified. By using the job-signal distinguishing label $D_L$ stored in the commit position, the results of the job to be committed can be retrieved from the relevant write queue and written into the data store 39. Correspondingly, at flush of a job, the write queue dedicated to the pipeline that handles the job can be identified by means of the associated unit label $U_L$. Subsequently, by using the associated distinguishing label $D_L$, the relevant entry in the write queue is identified and the results therein invalidated.

In the realization of FIG. 4, all speculative jobs that are placed behind the flushed job in the commit order are preferably also flushed to create space in the write queue 36. The reason for this is that the new execution of the flushed job, or the execution of another job, may need more space in the write queue than the flushed job. Therefore, the position of the flushed job in the job queue is determined by examining the pointer in the JQP register of the pipeline in question. Next, the job queue 32 is traversed to find all speculative jobs that are "younger" than the flushed job. For each found job, by using the unit label $U_L$ and job-signal distinguishing label $D_L$ associated with the job, the pipeline handling the job can be found and execution interrupted, and those entries that belong to the flushed job in the relevant write queue can be invalidated.

The functions for handling the job queue, such as associating labels to the job signals, writing information into the job queue fields and successively assigning commit priority to the job signals, are preferably controlled by software, e.g. in the form of a micro code instruction program or an assembler program. Other functions of the processing system, such as handling flushes and controlling the write queue, may also be implemented by software. It is of course possible to implement the above functions in hardware instead.

Figure 5:
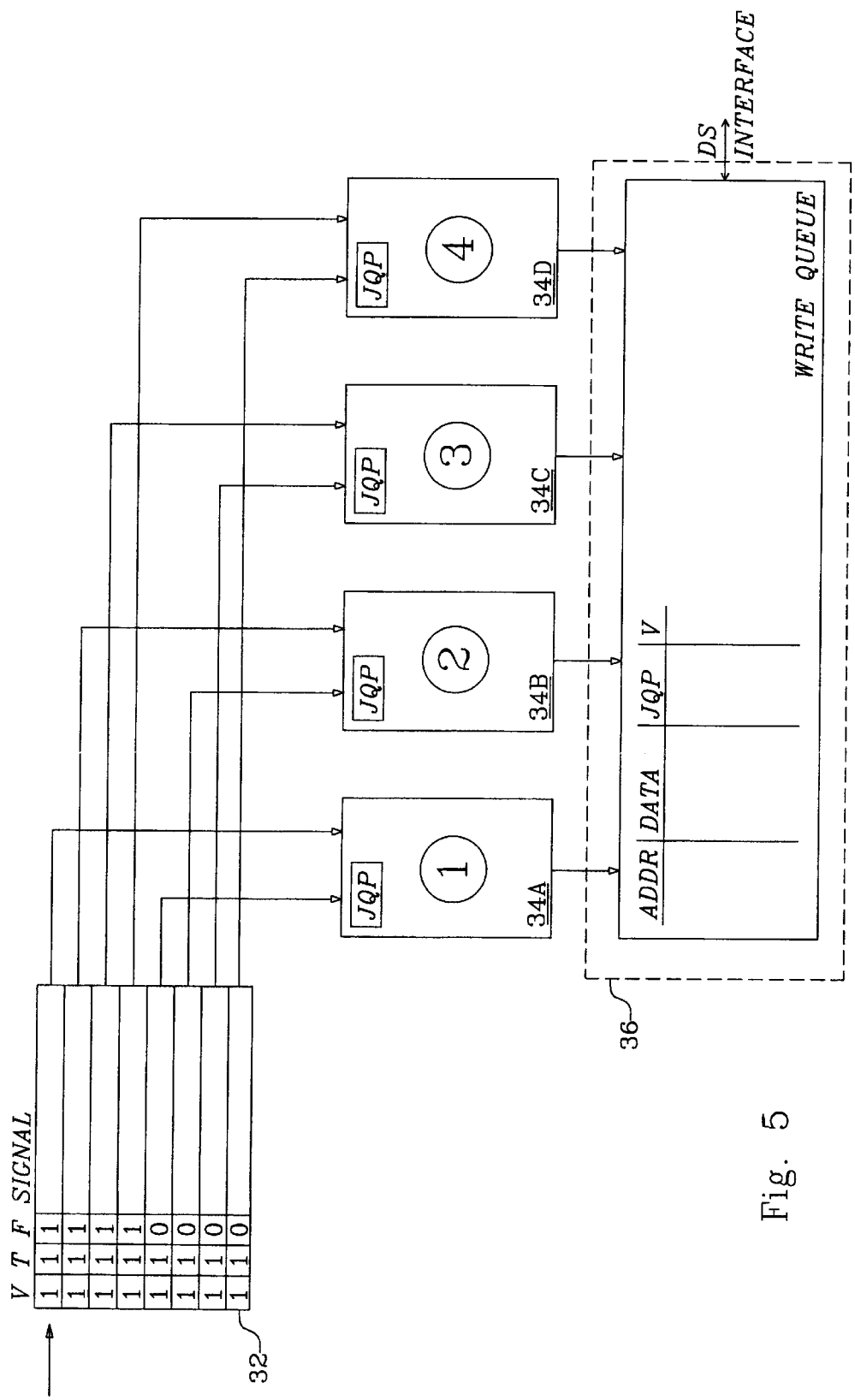
FIG. 5 is a schematic diagram illustrating the interrelationship between the job signal queue, the processing units and a write queue arrangement according to a third preferred embodiment.

FIG. 5 is a schematic diagram illustrating the interrelationship between the job signal queue, the processing units and a write queue arrangement according to a third preferred embodiment. FIG. 5 is similar to FIG. 3, except for the job queue and the write queue arrangement. In FIG. 5, the storage positions in job queue 32 do not generally have any identification fields such as $U_L$ and $D_L$. Instead the job queue pointer (JQP) is used as the sole identifier associated with each job signal. At commit and at flush of a job, the job queue pointer is used in a search procedure to identify which pipeline that is responsible for the job. Each entry in the write queue includes a data store address (ADDR), associated data (DATA), a job queue pointer tag (JQP) and a valid flag (V). At commit, the results of a job may be retrieved by means of the job queue pointer tag. At flush, the results of a job may be identified by means of the job queue pointer tag, and invalidated.

Preferably however, the write queue of FIG. 5 is provided with a field for a unit label tag to more easily find which pipeline that is responsible for a job.

Although the invention mainly has been described from the viewpoint that the protocol for assigning job signals to the processing units, keeping track of the job signals and managing the commit priority is performed by the job signal queue and its associated control functionality, it should be understood that it is also possible to manage this protocol from the execution pipeline side.

It should also be understood that the term "processing unit" is not limited to specialized hardware but also includes other types of processing units such as standard off-the-shelf microprocessors. In the case of standard microprocessors, dependency checking is normally implemented by instrumenting read and write instructions with extra code in the application software. Preferably, support for flushing is implemented in the application software and performed by the operating system or the virtual machine. If application software written for a single-processor system is to be migrated to and reused in a standard multiprocessor environment, the application software can be transformed via recompilation or equivalent. For example, a sequentially programmed application software may be automatically transformed by adding appropriate code for supporting speculative execution, including code for dependency checking and code for storing a copy of modified variables to enable proper flush or roll-back of a job, and then recompiling the software. The operating system or virtual machine of the standard multiprocessor system may also be modified to give support for speculative execution. For example, if a dependency is detected when executing code for dependency checking, the control may be transferred to the operating system/virtual machine which flushes the relevant job.

The embodiments described above are merely given as examples, and it should be understood that the present invention is not limited thereto. Further modifications, changes and improvements that retain the basic underlying principles disclosed and claimed herein are within the scope and spirit of the invention.

What is claimed is:

1. A method of handling job signals in a processing system having multiple processing units for parallel job signal processing, said method comprising the steps of:
   assigning a priority job signal to a selected processing unit having commit priority;
   executing a corresponding priority job non-speculatively;
   for at least one of the multiple processing units that does not have commit priority,
       assigning a first job signal to the processing unit that does not have commit priority, and speculatively executing a corresponding first job in parallel with the non-speculative execution of the priority job;
       determining that the processing unit that does not have commit priority has completed speculative execution of the first job prior to completion of the non-speculative execution of the priority job by the selected processing unit having commit priority;
       temporarily storing results of the speculatively executed first job in a write queue; and
       assigning a further job signal to the processing unit that does not have commit priority, and speculatively executing a corresponding further job in parallel with the non-speculative execution of the priority job;
   determining that the processing unit having commit priority has completed non-speculative execution of the priority job;
   determining whether the speculatively executed first job now has commit priority; and
   upon determining that the speculatively executed first job now has commit priority, retrieving the results of the speculatively executed first job from the write queue.

2. The method of handling job signals according to claim 1 further comprising the step of successively assigning commit priority to the job signals of the processing system, one job signal at a time according to a commit order, a job corresponding to a job signal having commit priority being enabled for non-speculative execution including write back to a memory system.

3. The method of handling job signals according to claim 2, further comprising the step of associating each job signal with an identifier that is unique for the job signal, said identifier being utilized to identify temporarily stored results of speculatively executed jobs for retrieval from the write queue.

4. The method of handing job signals according to claim 3, further comprising
   performing write back of the identified retrieved results for the speculatively executed jobs to the memory system.

5. The method of handling job signals according to claim 3, further comprising the steps of:
   detecting a dependency with the priority job for an identified speculative job for which the results have been temporarily stored in the write queue; and
   invalidating the results of the identified speculative job, whereby the speculative job is flushed.

6. The method of handling job signals according to claim 3, wherein the identifier is a pointer to the job signal in a job signal queue.

7. The method of handling job signals according to claim 3, wherein the identifier comprises a unit label representing the identity of the processing unit to which the job signal is assigned, and a job-signal distinguishing label representing the identity the job signal is given in the processing unit.

8. The method of handling job signals according to claim 5, further comprising the step of flushing all speculative jobs that are placed behind the flushed job in the commit order.

9. The method of handling job signals according to claim 5, further comprising the steps of:
   clearing the identifier associated with a flushed job;
   reassigning the job signal corresponding to the flushed job to a processing unit for execution; and
   associating the reassigned job signal with a new identifier.

10. The method of handling job signals according to claim 7, further comprising the step of reassigning a speculatively executed job that has been flushed to the processing unit identified by the associated unit label to restart execution of the job.

11. A processing system having multiple processing units for processing parallel job signals, said processing system comprising:
   a selected processing unit having commit priority, said selected processing unit executing a priority job non-speculatively;
   for at least one of the multiple processing units that does not have commit priority,
      means for assigning a first job signal to the processing unit that does not have commit priority for speculative execution of a corresponding first job in parallel with the non-speculative execution of the priority job;
      means for determining that the processing unit that does not have commit priority has completed speculative execution of the first job prior to completion of the non-speculative execution of the priority job by the selected processing unit having commit priority;
      a write queue for temporarily storing results of the speculatively executed first job; and
      means for assigning a further job signal to the processing unit that does not have commit priority for speculative execution of a corresponding further job in parallel with the non-speculative execution of the priority job;
   means for determining that the processing unit having commit priority has completed non-speculative execution of the priority job;
   means for determining whether the speculatively executed first job now has commit priority; and
   means for retrieving the results of the speculatively executed first job from the write queue upon determining that the speculatively executed first job now has commit priority.

12. The processing system according to claim 11, further comprising means for successively assigning commit priority to the job signals of the processing system, one job signal at a time according to a commit order, a job corresponding to a job signal having commit priority being enabled for non-speculative execution including write back to a memory system.

13. The processing system according to claim 12, further comprising means for associating each job signal with an identifier that is unique for the job signal.

14. The processing system according to claim 13, further comprising means for performing write back of the identified retrieved results for the speculatively executed jobs to the memory system.

15. The processing system according to claim 13, wherein the identifier comprises:
   a unit label representing the identity of the processing unit to which the job signal is assigned; and
   a job-signal distinguishing label representing the identity the job signal is given in the processing unit.

16. The processing system according to claim 14, further comprising:
   means for interrupting a speculative job when a data-dependency with the job having commit priority is detected;
   means for identifying the temporarily stored results of the interrupted speculative job by means of the associated identifier; and
   means for invalidating the identified results, whereby the job holding a data dependency is flushed.

17. The processing system according to claim 14, wherein the identifier is a pointer to the job signal in the write queue.

18. The processing system according to claim 15, further comprising:
   a number of write queues one write queue dedicated to each processing unit for temporarily storing, for each speculatively executed job of the processing unit, results of the job in such a manner that the results are retrievable by means of the job-signal distinguishing label associated with the corresponding job signal;
   means for determining, for the job signal with commit priority, which processing unit the job signal is assigned to based on the unit label associated with the job signal;
   means for retrieving the results of the corresponding job from the write queue dedicated to the determined processing unit; and
   means for performing write back of the retrieved results to a memory system.

19. The processing system according to claim 16, further comprising means for flushing all speculative jobs that are placed behind the flushed job in the commit order.

20. The processing system according to claim 16, further comprising:
   means for clearing the identifier associated with a flushed job;
   means for reassigning the job signal corresponding to the flushed job to a processing unit for execution; and
   means for associating the reassigned job signal with a new identifier.

21. A method of handling job signals in a processing system having multiple processing units for parallel job signal processing, said method comprising the steps of:
   assigning a priority job signal to a selected processing unit having commit priority;
   non-speculatively executing a corresponding priority job by the selected processing unit;
   assigning a first job signal to a processing unit that does not have commit priority;
   speculatively executing by the processing unit that does not have commit priority, a first job corresponding to the first job signal, said first job being executed in parallel with the non-speculative execution of the priority job;
   determining whether the processing unit that does not have commit priority completes speculative execution of the first job prior to completion of the non-speculative execution of the priority job by the selected processing unit having commit priority;

upon determining that the processing unit that does not have commit priority completes speculative execution of the first job prior to completion of the non-speculative execution of the priority job:
   temporarily storing results of the speculatively executed first job in a write queue;
   assigning a second job signal to the processing unit that does not have commit priority; and
   speculatively executing a second job corresponding to the second job signal in parallel with the non-speculative execution of the priority job;
upon determining that the selected processing unit having commit priority completes non-speculative execution of the priority job prior to completion of the speculative execution of the first job by the processing unit that does not have commit priority:
   writing back results of the priority job to a memory system;
   assigning a further job signal to the selected processing unit having commit priority; and
   speculatively or non-speculatively executing a further job corresponding to the further job signal in parallel with the speculative execution of the first job by the processing unit that does not have commit priority.

22. The method of handling job signals according to claim 21, further comprising, upon determining that the processing unit that does not have commit priority completes speculative execution of the first job prior to completion of the non-speculative execution of the priority job, and after temporarily storing the results of the speculatively executed first job in the write queue, the steps of:
   determining that the selected processing unit having commit priority has completed non-speculative execution of the priority job;
   determining whether the speculatively executed first job now has commit priority; and
   upon determining that the speculatively executed first job now has commit priority, retrieving the results of the speculatively executed first job from the write queue.

23. The method of handling job signals according to claim 22, further comprising the steps of:
   determining whether a dependency with the priority job is detected for the speculatively executed first job;
   if no dependency is detected and the speculatively executed first job now has commit priority, writing back results of the speculatively executed first job to the memory system; and
   if a dependency is detected, invalidating the results of the speculatively executed first job, whereby the speculatively executed first job is flushed.

* * * * *